UNITED STATES PATENT OFFICE.

WILLIAM RENNYSON, OF NORRISTOWN, ASSIGNOR OF ONE HALF TO HUGH BURGESS, OF ARDMORE, PENNSYLVANIA.

COMPOSITION OF BRICK.

SPECIFICATION forming part of Letters Patent No. 366,609, dated July 12, 1887.

Application filed November 5, 1886. Serial No. 218,066. (No specimens.)

*To all whom it may concern:*

Be it known that I, WILLIAM RENNYSON, a citizen of the United States, residing in Norristown, Montgomery county, State of Pennsylvania, have invented an Improved Building and Paving Brick or Block, of which the following is a specification.

The object of my invention is to make, as economically as possible, an efficient brick or block which will be useful for building or paving purposes; and this object I attain by utilizing for that purpose the waste "sludge" resulting from the boiling of carbonated alkalies with caustic lime, a process which is carried out to a large extent in paper-works, among others. For example, in the manufacture of paper, particularly from wood and straw, it is customary to boil the stock in a solution of soda-ash or carbonate of soda combined with lime. After the boiling operation, more or less of the soda-ash is generally recovered from the solution, leaving a sludge which has heretofore been considered a waste material. Lime is the principal component element of this waste sludge, its composition being about one-half carbonate of lime and a little over one-tenth quicklime, together with one-fifth vegetable-charcoal, and a small quantity of impure carbonate of soda and slight traces of silica. These proportions of course vary in different cases. In some instances the soda-ash or carbonate of soda is not recovered from the solution, so that in such case the waste would contain a larger proportion of carbonate of soda. Generally, however, the alkaline carbonate is recovered to a greater or less extent, for reasons of economy. I take this waste material and utilize it for the making of building-bricks or paving bricks or blocks by molding it into the ordinary cubic or any other desired form, under pressure, and of any suitable size. In making the building or paving bricks or blocks from this waste material, the sludge may be used alone in some cases; or I may mix with it a small proportion of tar or asphaltum, and in some cases, also, bar-sand or stone broken into small pieces. For instance, I may make a composition of about ninety-seven parts of the sludge to three of tar or asphaltum; or, when it is desired to add broken stone or bar-sand to the mixture, I may use from eighty to ninety-five parts of the sludge with from ten to three parts of broken stone or bar-sand, and from ten to two parts of tar or asphaltum, as the case may require.

If desired, other elements which are commonly used in the manufacture of artificial stone or composite bricks may be added to the sludge; but I prefer to use a composition in which broken stone or bar-sand and tar in a small proportion are added to the sludge, the main portion of the composition in all cases being waste sludge.

I claim as my invention—

1. A composition of matter for the manufacture of bricks, consisting of carbonate of lime, quicklime, and vegetable matter, substantially as specified.

2. A composition of matter consisting of carbonate of lime, quicklime, vegetable matter, and asphaltum formed into bricks, substantially as specified.

In testimony whereof I have signed my name to this specification in the presence of two subscribing witnesses.

WILLIAM RENNYSON.

Witnesses:
  WILLIAM D. CONNER,
  HARRY SMITH.